(12) United States Patent
Sebright et al.

(10) Patent No.: US 8,287,056 B2
(45) Date of Patent: Oct. 16, 2012

(54) LOBED BUSHING FOR TRACK ASSEMBLY AND TRACK-TYPE MACHINE USING SAME

(75) Inventors: Jason L. Sebright, Chillicothe, IL (US); Mark S. Diekevers, Metamora, IL (US); Benoit Abello, Peoria, IL (US); Steven Williamson, Canton, IL (US)

(73) Assignee: Caterpillar Inc., Peoria, IL (US)

( * ) Notice: Subject to any disclaimer, the term of this patent is extended or adjusted under 35 U.S.C. 154(b) by 214 days.

(21) Appl. No.: 12/630,321

(22) Filed: Dec. 3, 2009

(65) Prior Publication Data

US 2010/0139993 A1 Jun. 10, 2010

Related U.S. Application Data

(60) Provisional application No. 61/201,081, filed on Dec. 5, 2008.

(51) Int. Cl.
*B21L 9/00* (2006.01)
*B62D 55/08* (2006.01)

(52) U.S. Cl. .......................................... 305/163; 305/59

(58) Field of Classification Search .......... 305/102–106, 305/118, 163–164, 195, 202–204, 59; 474/206, 474/214–217

See application file for complete search history.

(56) References Cited

U.S. PATENT DOCUMENTS

| 310,997 | A | 1/1885 | Heald |
|---|---|---|---|
| 2,199,292 | A | 4/1940 | Pierce |
| 2,430,573 | A | 11/1947 | Krotz |
| 2,678,569 | A | 5/1954 | Bremer |
| 3,313,578 | A | 4/1967 | Wright et al. |
| 3,614,177 | A | 10/1971 | Magee et al. |
| 3,960,412 | A | 6/1976 | Shuler |
| 4,195,887 | A | 4/1980 | Ruddell |
| 4,407,551 | A | 10/1983 | Baylor |
| 5,030,175 | A | 7/1991 | Schwengel |
| 5,092,822 | A | 3/1992 | Wakabayashi |
| 5,192,252 | A | 3/1993 | Skurka et al. |
| 6,109,706 | A | 8/2000 | Oertley |
| 2003/0168912 | A1 | 9/2003 | Wodrich et al. |

FOREIGN PATENT DOCUMENTS

| KR | 20-0209232 | 1/2001 |
|---|---|---|
| KR | 10-2008-0038632 | 5/2008 |

*Primary Examiner* — Jason Bellinger
(74) *Attorney, Agent, or Firm* — Richard K. Chang; Finnegan, Henderson, Farabow, Garrett & Dunner LLP

(57) ABSTRACT

A lobed bushing is provided for a track assembly of a track-type machine. The track assembly includes a first chain and a second chain coupled together with a track pin. A bushing, defining a longitudinal axis, includes a central bore oriented along the longitudinal axis and extending from a first end of the bushing to a second end of the bushing for receiving the track pin. The bushing includes a first lobe positioned at a first location about the longitudinal axis and a second lobe positioned at a second location about the longitudinal axis that is less than about 180° from the first location. The first end of the bushing has a substantially cylindrical shape.

15 Claims, 5 Drawing Sheets

LOBED BUSHING FOR TRACK ASSEMBLY AND TRACK-TYPE MACHINE USING SAME

CROSS-REFERENCED TO RELATED APPLICATIONS

This application claims benefit of U.S. Provisional Application No. 61/201,081 filed Dec. 5, 2008.

TECHNICAL FIELD

The present disclosure relates generally to an undercarriage for a track-type machine, and more particularly to a lobed bushing for use with a track assembly of the undercarriage.

BACKGROUND

Track-type machines are in widespread use in construction, mining, forestry, and other similar industries. The undercarriage of such track-type machines utilizes track assemblies, rather than wheels, to provide ground-engaging propulsion. Such track assemblies may be preferred in environments, such as the environments identified above, where creating sufficient traction is problematic. Specifically, rather than rolling across a work surface on wheels, track-type machines utilize one or more track assemblies that include an endless loop of coupled track links defining outer surfaces, which support ground-engaging track shoes, and inner surfaces that travel about one or more rotatable track-engaging elements, such as, for example, drive sprockets, idlers, tensioners, and rollers.

During typical operation of the track-type machine, the various moving parts of the track assembly may undergo significant wear. Specifically, for example, the drive sprockets, idlers, rollers, and track links may all experience wear from nearly constant metal-to-metal contact. Of particular interest is the wear between the drive sprockets and bushings. According to an exemplary embodiment, pin and bushing assemblies may couple first and second sets of track links of the track assembly. Specifically, bushings, which may or may not be configured to rotate, may be positioned about track pins and may engage the drive sprocket when the sprocket is driven in a forward, or a reverse, rotational direction. Such interaction may cause significant wear on contact surfaces of the bushings and drive sprocket and, as a result, may change the operating pitch between the components, resulting in increased load stresses and possibly failure of the track assembly.

As a result, numerous strategies have been developed to attempt to prolong the useful life of some of the track assembly components. For example, U.S. Pat. No. 3,960,412 discloses a pin bushing having an outer substantially oval configuration to define a pair of oppositely disposed wear surfaces. Sprocket teeth, at their roots, engage a first wear surface of the pair of oppositely disposed wear surfaces during operation of the track assembly. Once the first wear surface is worn to a predetermined point, segments defining the sprocket may be replaced with segments having a higher pitch, thus moving the pitch diameter back to approximately the original pitch diameter, as defined by the pin bushing and sprocket combination. After additional wear occurs, the pin bushing may be rotated such that roots of the sprocket teeth engage a second wear surface of the pair of wear surfaces. In this configuration, the segments having a higher pitch may be replaced with the original sprocket segments. While this method of replacing sprocket segments may serve to prolong the useful life of relevant portions of the track assembly, it should be appreciated that there is a continuing need for improving various operational characteristics of track assemblies.

The present disclosure is directed to one or more of the problems set forth above.

SUMMARY OF THE DISCLOSURE

In one aspect, a lobed bushing is provided for a track assembly of a track-type machine. The track assembly includes a first chain and a second chain coupled together with a track pin. A bushing, defining a longitudinal axis, includes a central bore oriented along the longitudinal axis and extending from a first end of the bushing to a second end of the bushing for receiving the track pin. The bushing includes a first lobe positioned at a first location about the longitudinal axis and a second lobe positioned at a second location about the longitudinal axis that is less than about 180° from the first location. The first end of the bushing has a substantially cylindrical shape.

In another aspect, a machine includes a frame and a first track assembly coupled with the frame. The first track assembly includes a first chain and a second chain coupled together with a track pin, and a ground-engaging track shoe attached to the first chain and the second chain. A bushing, having a first lobe and a second lobe, is positioned about the track pin. A drive sprocket is configured to drive the first track assembly in a forward direction and a reverse direction. The first lobe engages the drive sprocket when the first track assembly is driven in the forward direction and the second lobe engages the drive sprocket when the first track assembly is driven in the reverse direction.

In yet another aspect, a method of operating a machine undercarriage includes a step of engaging a right flank of a drive sprocket tooth with a first lobe of a bushing during rotation of a drive sprocket in a forward rotational direction. A left flank of the drive sprocket tooth engages a second lobe of the bushing during rotation of the drive sprocket in a reverse rotational direction.

DETAILED DESCRIPTION

Figure 1:
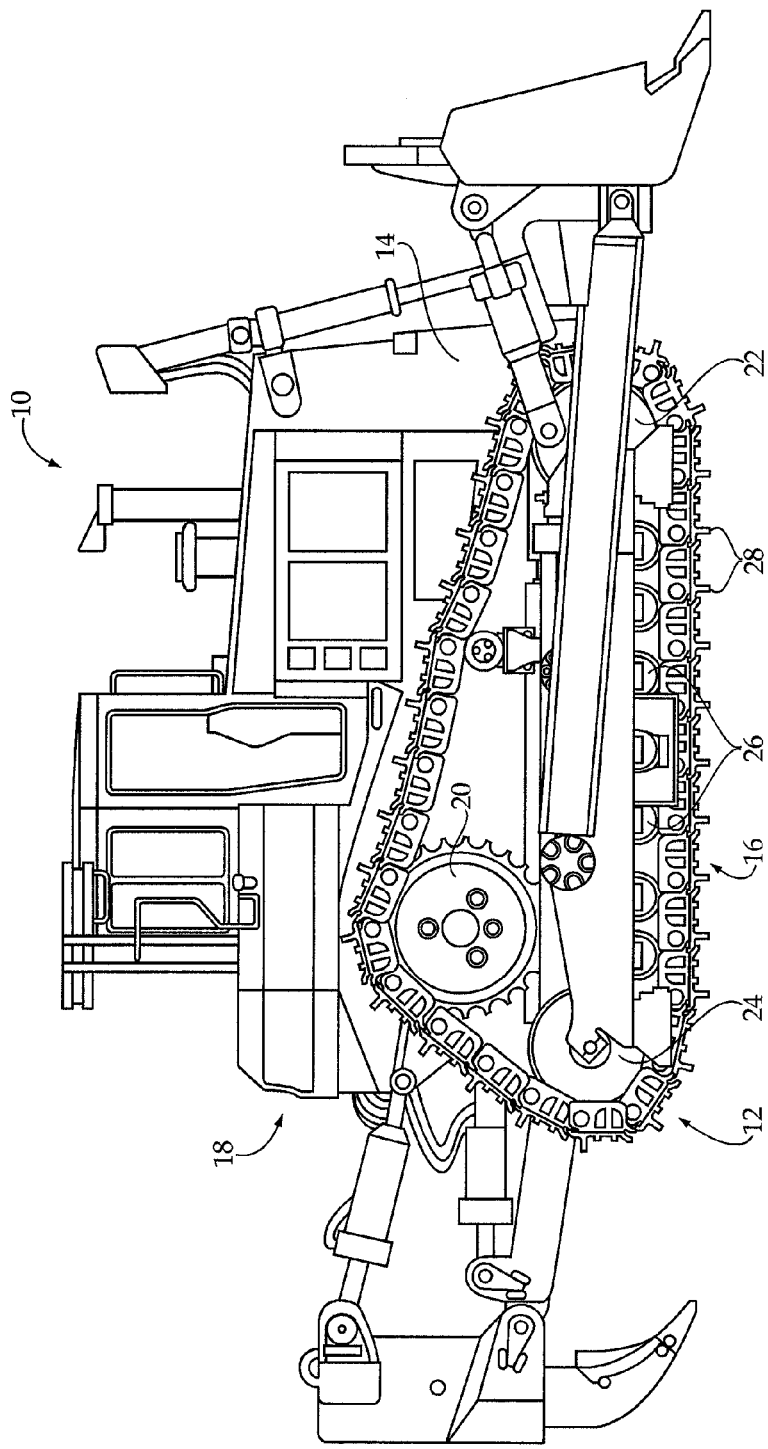
FIG. 1 is a side diagrammatic view of an exemplary machine, according to the present disclosure.

An exemplary embodiment of a machine 10 is shown generally in FIG. 1. The machine 10 may be a dozer, loader, or excavator, or any other on-highway or off-highway vehicle utilizing a track-type undercarriage 12, as described herein. As such, machine 10 may also be referenced herein as a track-type machine. The machine 10 may generally include a frame 14 having a track assembly 16, or first track assembly, disposed at a first side 18 thereof, and a second track assembly (not shown) disposed at a second, or opposite, side thereof.

Together, the track assemblies may engage the ground, or other surface, to propel the machine 10 during work operations. It should be appreciated that the track assemblies of machine 10 may be similar and, further, may represent mirror images of one another. As such, only track assembly 16, or first track assembly, will be described herein in greater detail.

Figure 2:
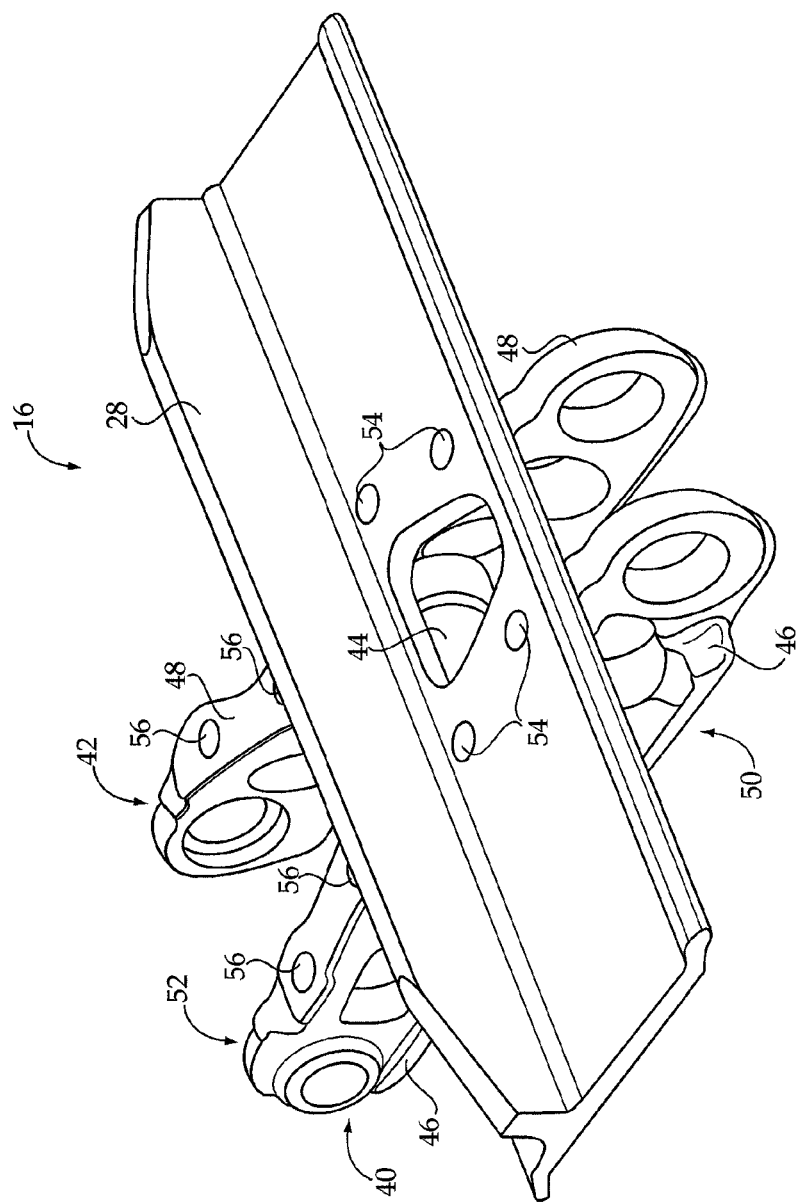
FIG. 2 is a perspective view of a portion of a track assembly of the machine of FIG. 1, according to the present disclosure.

Turning now to FIG. 2, a portion of the track assembly 16 is shown in greater detail. Specifically, the track assembly 16 may include a first chain 40 and a second chain 42 coupled together via a pin and bushing assembly 44. According to the exemplary embodiment, the first chain 40 may comprise a plurality of interconnected outboard links 46, such as links 46a and 46b, alternating with a plurality of interconnected inboard links 48, such as links 48a and 48b. However, it should be appreciated that other track configurations, such as those having S-shaped links or multi-piece links, are also contemplated herein. Together, the first chain 40 and the second chain 42 may define an inner surface 50 for engaging the drive sprocket 20, front idler 22, rear idler 24, and rollers 26, as depicted in FIG. 1. An outer surface 52 of the first and second chains 40 and 42 may be configured to support ground-engaging track shoes, such as track shoe 28. According to one embodiment, the ground-engaging track shoes, such as track shoe 28, may be attached to adjacent links of the track assembly 16 by securing bolts (not shown) within attachment bores 54 of track shoe 28 and corresponding attachment bores 56 within the first and second chains 40 and 42.

Turning now to FIG. 2, a portion of the track assembly 16 is shown in greater detail. Specifically, the track assembly 16 may include a first chain 40 and a second chain 42 coupled together via a pin and bushing assembly 44. According to the exemplary embodiment, the first chain 40 may comprise a plurality of interconnected outboard links, such as links 46a and 46b, alternating with a plurality of interconnected inboard links 48a and 48b. However, it should be appreciated that other track configurations, such as those having S-shaped links or multi-piece links, are also contemplated herein. Together, the first chain 40 and the second chain 42 may define an inner surface 50 for engaging the drive sprocket 20, front idler 22, rear idler 24, and rollers 26, as depicted in FIG. 1. An outer surface 52 of the first and second chains 40 and 42 may be configured to support ground-engaging track shoes, such as track shoe 28. According to one embodiment, the ground-engaging track shoes, such as track shoe 28, may be attached to adjacent links of the track assembly 16 by securing bolts (not shown) within attachment bores 54 of track shoe 28 and corresponding attachment bores 56 within the first and second chains 40 and 42.

Figure 3:
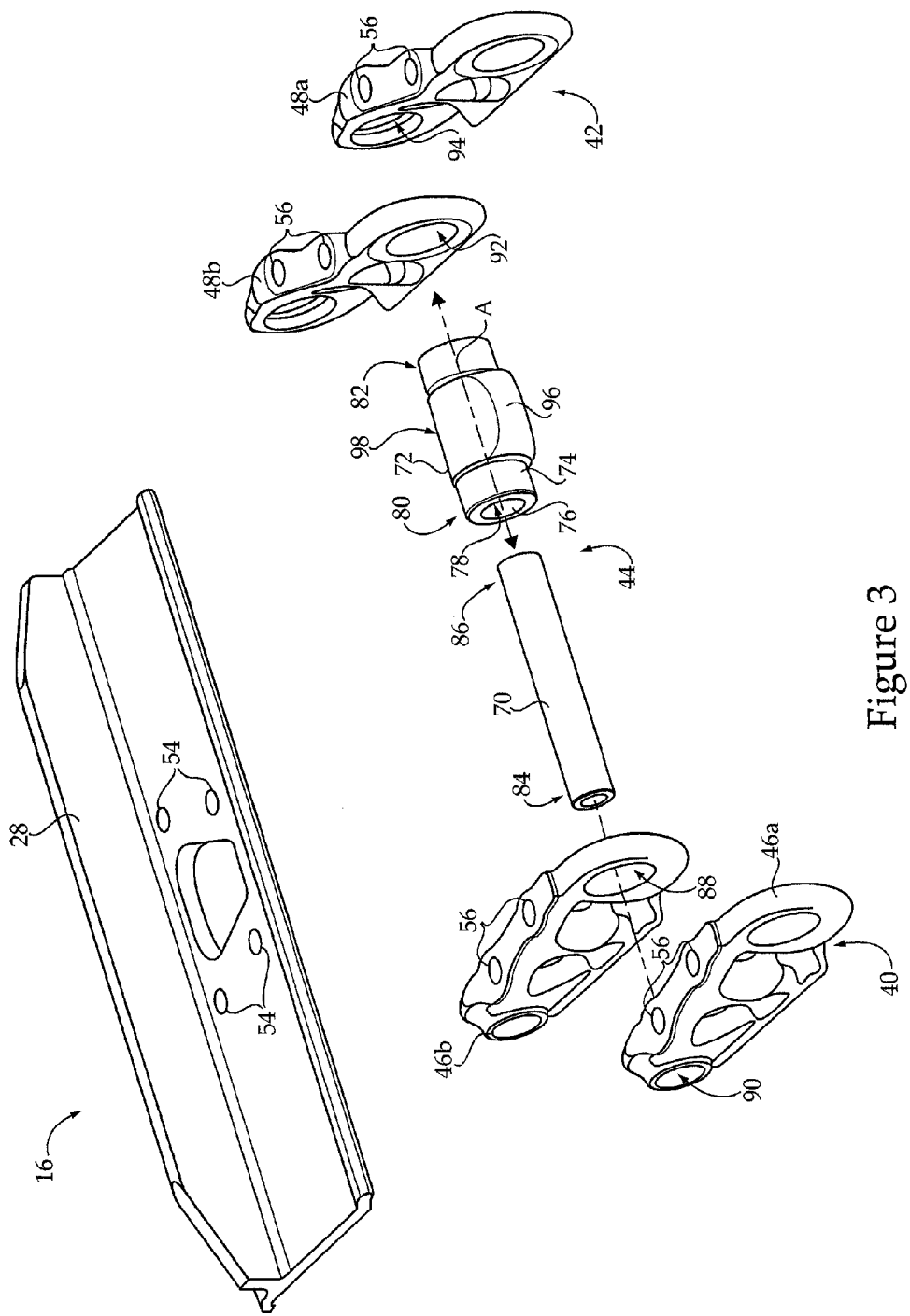
FIG. 3 is an exploded view of the track assembly components depicted in FIG. 2, according to the present disclosure.

Turning now to FIG. 3, an exploded view of the track assembly components depicted in FIG. 2 is illustrated. Specifically, the pin and bushing assembly 44, as shown, may include a pin 70 and a bushing 72, also referenced herein as a lobed bushing. The bushing 72, described later in greater detail, may define a longitudinal axis A and may have an outer surface, or circumference, 74 and an inner surface 76, which defines a central bore 78. The central bore 78 may be oriented along the longitudinal axis A and may extend from a first end 80 of the bushing 72 to a second end 82 of the bushing 72. According to one embodiment, the track pin 70 may be received within the central bore 78 of the bushing 72 such that relative rotation between the track pin 70 and the bushing 72 may be permitted. As shown, the track pin 70 and, thus, central bore 78 may have substantially cylindrical shapes. However, it should be appreciated that alternative shapes or cross-sections are also contemplated for use herein.

The track pin 70, according to the exemplary embodiment, may have a longer length than the bushing 72. As such, a first end 84 and a second end 86 of the track pin 70 may each extend past respective ends 80 and 82 of the bushing 72. The first end 84 of the track pin 70 may be positioned through a first opening 88 of outboard link 46b and a second opening 90 of outboard link 46a. Similarly, the second end 86 of the track pin 70 may be positioned through a first opening 92 of inboard link 48b and a second opening 94 of inboard link 48a. According to one embodiment, the first end 84 of the track pin 70 may be press-fit within the second opening 90 of outboard link 46a, while the second end 86 of the track pin 70 may be press-fit within the second opening 94 of inboard link 48a. Although a specific means for attachment is described, it should be appreciated that any known means for securing the track pin 70 to the first chain 40 and second chain 42 is contemplated.

The bushing 72 may also be secured to the first and second chains 40 and 42 of the track assembly 16 using an interference fit. Specifically, for example, the first end 80 of the bushing 72 may be press-fit within the first opening 88 of the outboard link 46b, and the second end 82 of the bushing 72 may be press-fit within the first opening 92 of the inboard link 48b. As such, the first and second ends 80 and 82 of the bushing 72 may each include a cylindrical shape, or cylindrical cross-section transverse to the longitudinal axis A, as necessary to press-fit the bushing 72 within the chains 40 and 42. It should be appreciated that by fixedly attaching the track pin 70 to links 46b and 48b and attaching the bushing 72 to links 46a and 48a, and by allowing relative rotation of the track pin 70 within the bushing 72, a desired amount of flexibility of the track assembly 16 is permitted.

As indicated above, the bushing 72 may also be referenced herein as a lobed bushing. Specifically, the bushing 72 may include one or more lobes, such as a first lobe 96 positioned along the outer surface 74, or circumference, of the bushing 72. As shown, the first lobe 96 may extend from the outer surface 74 of the bushing 72 at a central portion 98 thereof, thus maintaining a substantially cylindrical shape of ends 80 and 82 for assembly, as described above. According to alternative embodiments, however, the first lobe 96, and additional lobes described herein, may extend the entire length of the bushing 72. According to the exemplary embodiment, the first lobe 96, and additional lobes described herein, may comprise sacrificial wear material consisting of, for example, hardened forged or cast material of the bushing 72.

Figure 4:
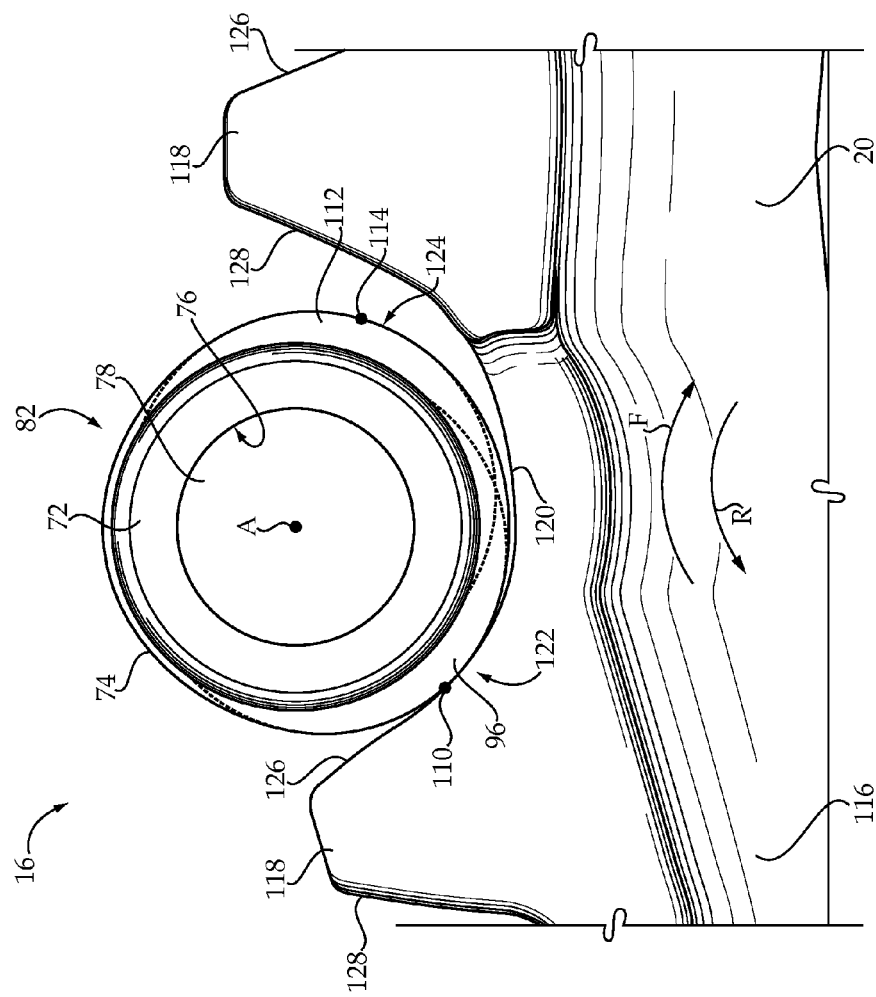
FIG. 4 is a side diagrammatic view of a lobed bushing, disclosed herein, oriented to engage a drive sprocket of the machine of FIG. 1, according to the present disclosure.

According to a preferred embodiment, as shown in FIG. 4, the bushing 72 may include two lobes. Specifically, the bushing 72 may include the first lobe 96, introduced above, positioned generally at a first location 110 about the longitudinal axis A and a second lobe 112 positioned at a second location 114 about the longitudinal axis A that is less than about 180° from the first location 110. It should be appreciated that locations 110 and 114 may represent central portions of the respective lobes 96 and 114, areas about the circumference of the bushing 72 that may experience significant wear, or any other desired position. Further, as described herein, it may be desirable to increase a thickness of the bushing 72, such as by providing sacrificial wear material as described herein, by an amount proportional to anticipated amounts of wear at every point around the bushing 72. As such, locations 110 and 114, and/or additional locations, may represent reference points having a fixed relationship relative to lobes 96 and 112, respectively.

During operation of the machine 10 (FIG. 1), the drive sprocket 20 may be rotated in a forward rotational direction F, thus driving the track assembly 16, and machine 10, in a forward direction, or may be rotated in a reverse rotational direction R, thus driving the track assembly 16, and machine 10, in a reverse direction. The drive sprocket 20, as is known in the art, may include a plurality of outer track-contacting segments, such as a drive sprocket segment 116, only a portion of which is shown. The drive sprocket segments may each include a plurality of drive sprocket teeth 118 alternating with a plurality of pockets, or roots, 120. It should be appreciated that, according to one embodiment, the operating pitch of the drive sprocket 20 and track assembly 16 may be selected such that the bushing 72 contacts the drive sprocket teeth 118, rather than the roots 120, of the drive sprocket 20 during typical operation.

According to the exemplary embodiment, the first lobe 96 may define a forward wear region 122 of the bushing 72 during rotation of the drive sprocket 20 in the forward rotational direction F, while the second lobe 112 may define a reverse wear region 124 of the bushing 72 during rotation of the drive sprocket 20 in the reverse rotational direction R. As used herein, a wear region may generally represent an area of the bushing 72 that may experience wear due to contact of the bushing 72 with the drive sprocket 20, or any other component of the undercarriage 12. According to the exemplary embodiment, the bushing 72 may be oriented such that the first lobe 96 engages right flanks 126 of the drive sprocket teeth 118 during rotation of the drive sprocket 20 in the forward rotational direction F. Further, the second lobe 112 may engage left flanks 128 of the drive sprocket teeth 118 during rotation of the drive sprocket 20 in the reverse rotational direction R.

More specifically, it should be appreciated that during typical operation, the bushings, such as bushing 72, may be subjected to many cyclic loads as the track assembly 16 is rotated around the drive sprocket 20 and idlers 22 and 24. For example, as the track assembly 16 is moved in a forward direction and in a reverse direction, an outer surface 74, or circumference, of the bushing 72 may be subjected to cyclic loads as the bushing engages the rotating drive sprocket 20. Over the course of many hours of operation, areas where the drive sprocket 20 contacts the bushing 72, in both the forward and reverse rotational directions F and R of the drive sprocket 20, may wear away, thus changing the operating pitch between the components, which may result in increased load stresses and possibly failure of one or more components of the track assembly 16.

Further, significant noises may arise from machine undercarriages utilizing track assemblies, such as track assembly 16. Such noises may be considered to arise between several track assembly 16 and machine 10 components, including contact between the drive sprocket 20 and the bushings, such as bushing 72. Specifically, the noises may include metal-to-metal contact noises, which result from impact of the rotating drive sprocket 20 with the bushing 72. Further, such noises may increase when the bushing 72 becomes worn, as described above, and the track assembly 16 slackens, thus allowing the outer surface 74 of the bushing 72 to contact roots 120 of the drive sprocket 20.

Utilizing the lobed bushing 72, as described herein, which includes at least the first lobe 96 and the second lobe 112 may extend the useful operation of the bushing 72 and, thus, track assembly 16 by providing the forward wear region 122 and the reverse wear region 124, as described herein. Specifically, the bushing 72 may be oriented such that the first lobe 96 engages right flanks 126 of drive sprocket teeth 118 during rotation of the drive sprocket 20 in the forward rotational direction F. Further, the second lobe 112 may engage left flanks 128 of the drive sprocket teeth 118 during rotation of the drive sprocket 20 in the reverse rotational direction R. Further, such sacrificial wear material, added at the forward wear region 122 and the reverse wear region 124 of the bushing 72, may prolong the occurrence of increased noise, as described above.

Figure 5:
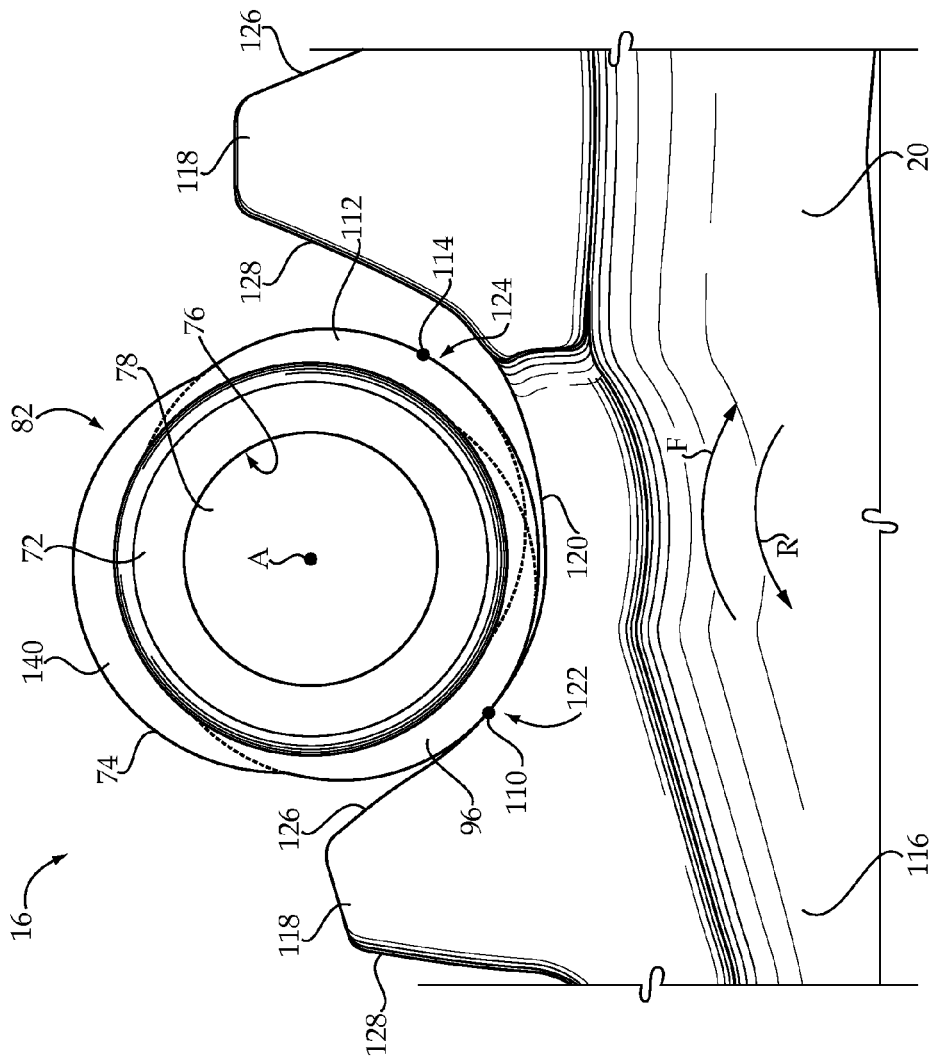
FIG. 5 is a side diagrammatic view of an alternative embodiment of the lobed bushing of FIG. 4, according to the present disclosure.

According to some embodiments, the bushing 72 may include a third lobe 140, as depicted in FIG. 5. As should be appreciated, the third lobe 140 may not engage the drive sprocket 20 during operation of the track assembly 16. However, the additional lobe 140 may be useful, such as during manufacturing and/or assembly. For example, it may be desirable to extrude the outer surface 74 and central bore 78 of the bushing 72 simultaneously. As such, it may be preferable to extrude the bushing 72 with three lobes 96, 112, and 140 being positioned symmetrically about the longitudinal axis A. After extruding the lobed bushing 72, according to one manufacturing process, the ends 80 and 82 may be machined into a cylindrical shape, or other useful shape, for attachment of the bushing 72 with the track chains 40 and 42, as described above with respect to FIG. 3.

It should also be appreciated that the drive sprocket 20 described herein may include one or more modifications to accommodate the lobed bushing 72. For example, spacing between the drive sprocket teeth 118 may be increased from a conventional design to accommodate an increased outer diameter of the bushing 72, as defined by the lobes 96, 112, and 140. According to one embodiment, an outer diameter of the drive sprocket 20 may be increased to provide such increased spacing of the drive sprocket teeth 118. This modification and others are contemplated, as necessary, to incorporate the use of lobed bushing 72 into the track-type undercarriage 12.

INDUSTRIAL APPLICABILITY

In general, a lobed bushing for a track assembly of a track-type machine may include a first lobe and a second lobe. The lobed bushing, which may be provided singly or in combination with the track assembly or track-type machine, may define a longitudinal axis and may have a central bore oriented along the longitudinal axis. The central bore may extend from a first end of the bushing to a second end of the bushing for receiving a track pin. The first lobe may be positioned at a first location about the longitudinal axis and the second lobe may be positioned at a second location about the longitudinal axis. The second location, according to one embodiment, may be less than about 180° from the first location. According to some embodiments, the lobed bushing may also include a third lobe, such that the first lobe, second lobe, and third lobe are symmetrical about the longitudinal axis.

The track assembly may include a first chain and a second chain coupled together with the track pin, which, as mentioned above, may be received within the central bore of the lobed bushing. In addition, first and second ends of the lobed bushing may have a substantially cylindrical shape, or other useful shape, such that the first and second ends may be press-fit within the first and second chains, respectively. The track assembly may also include a drive sprocket having a forward rotational direction and a reverse rotational direction. The first lobe may define a forward wear region of the lobed bushing during rotation of the drive sprocket in the forward rotational direction, while the second lobe may define a reverse wear region of the lobed bushing during rotation of the drive sprocket in the reverse rotational direction.

According to a specific embodiment, the lobed bushing may be oriented such that the first lobe engages a right flank of a drive sprocket tooth during rotation of the drive sprocket in the forward rotational direction, and the second lobe engages a left flank of the drive sprocket tooth during rotation of the drive sprocket in the reverse rotational direction. As such, sacrificial wear material may be removed from the first lobe of the lobed bushing when the track assembly and, thus, machine are driven in the forward direction. Similarly, sacrificial wear material may be removed from the second lobe of the lobed bushing when the track assembly and machine are driven in the reverse direction.

The lobed bushing may find potential application in any machine, such as a track-type tractor, which utilizes a track-type undercarriage. Further, the lobed bushing of the present disclosure may be applicable to a track assembly of a track-type undercarriage that includes one or more sprocket driven chains. Yet further, the present disclosure may be applicable to track assemblies in which bushings, positioned between drive chains of the track assembly, are driven by a drive sprocket and, therefore, subject to significant wear. Such machines may include, but are not limited to, dozers, loaders, excavators, or any other on-highway or off-highway vehicles or stationary machines that utilize a track assembly, as described herein.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims.

What is claimed is:

1. A lobed bushing for a track assembly of a track-type machine, the track assembly including a first chain and a second chain coupled together with a track pin, comprising:
 a bushing defining a longitudinal axis and having a central bore oriented along the longitudinal axis and extending from a first end of the bushing to a second end of the bushing for receiving the track pin, wherein an outer surface of the bushing at each of the first and second ends includes a substantially cylindrical shape; and
 wherein a substantially central portion of the bushing extending between the first and second ends includes a first lobe defining a first wear region and being oriented at a first location about the longitudinal axis, and a second lobe defining a second wear region and being oriented at a second location about the longitudinal axis, is the second location being less than about 180° around the longitudinal axis from the first location, wherein a thickness of the substantially central portion of the bushing is greatest at the first and second locations.

2. The lobed bushing of claim 1, wherein the first end is press-fit within the first chain and the second end is press-fit within the second chain.

3. The lobed bushing of claim 1, further including a third lobe, wherein the first lobe, second lobe, and third lobe are symmetrical about the longitudinal axis.

4. The lobed bushing of claim 1, wherein the track assembly includes a drive sprocket having a forward rotational direction and a reverse rotational direction.

5. The lobed bushing of claim 4, wherein the first lobe defines a forward wear region of the bushing during rotation of the drive sprocket in the forward rotational direction, and the second lobe defines a reverse wear region of the bushing during rotation of the drive sprocket in the reverse rotational direction.

6. The lobed bushing of claim 5, wherein the bushing is oriented such that the first lobe engages a right flank of a drive sprocket tooth during rotation of the drive sprocket in the forward rotational direction, and the second lobe engages a left flank of the drive sprocket tooth during rotation of the drive sprocket in the reverse rotational direction.

7. A machine, comprising:
 a frame;
 a first track assembly coupled with the frame, the first track assembly including a first chain and a second chain coupled together with a track pin, a ground-engaging track shoe attached to the first chain and the second chain, and a bushing positioned about the track pin, wherein an outer surface of the bushing at each of the first and second ends of the bushing includes a substantially cylindrical shape, wherein a substantially central portion of the bushing extending between the first and second ends includes a first lobe oriented at a first location about the longitudinal axis and a second lobe oriented, at a second location about the longitudinal axis, the second location being less than about 180° around the longitudinal axis from the first location, wherein a thickness of the sub substantially central portion of the bushing is greatest at the first and second locations; and
 a drive sprocket configured to drive the first track assembly in a forward direction and a reverse direction, wherein the first lobe engages the drive sprocket when the first track assembly is driven in the forward direction and the second lobe engages the drive sprocket when the first track assembly is driven in the reverse direction.

8. The machine of claim 7, further including a third lobe, wherein the first lobe, second lobe, and third lobe are equidistantly spaced about the circumference of the bushing.

9. The machine of claim 7, wherein the bushing is oriented such that the first lobe engages a right flank of a drive sprocket tooth when the first track assembly is driven in the forward direction, and the second lobe engages a left flank of the drive sprocket tooth when the first track assembly is driven in the reverse direction.

10. The machine of claim 7, wherein the first end of the bushing is press-fit within the first chain and the second end of the bushing is press-fit within the second chain.

11. The machine of claim 7, further including a second track assembly, the first track assembly being positioned at a first side of the frame and the second track assembly being positioned at a second side of the frame.

12. A method of operating a track assembly of a track-type machine, comprising:
 providing a bushing having a thickness of a substantially central portion of the bushing that is greatest at a first location at which a first lobe is oriented and a second location at which a second lobes is oriented, wherein the substantially central portion extends between first and second substantially cylindrical ends of the bushing, wherein the second location is less than about 180° around the longitudinal axis from the first location;
 engaging a right flank of a drive sprocket tooth with the first lobe of the bushing during rotation of a drive sprocket in a forward rotational direction; and
 engaging a left flank of the drive sprocket tooth with the second lobe of the bushing during rotation of the drive sprocket in a reverse rotational direction.

13. The method of claim 12, wherein the first engaging step includes driving the track assembly in a forward direction.

14. The method of claim 13, wherein the second engaging step includes driving the track assembly in a reverse direction.

15. The method of claim 14, wherein driving the track assembly in the forward direction or the reverse direction includes engaging ground-engaging track shoes with a surface.

* * * * *